May 6, 1947.    A. H. DICKINSON ET AL    2,420,167
RELAY TYPE CROSS-TOTALIZING DEVICE FOR RECORD CARD DATA
Filed March 31, 1943    11 Sheets-Sheet 9
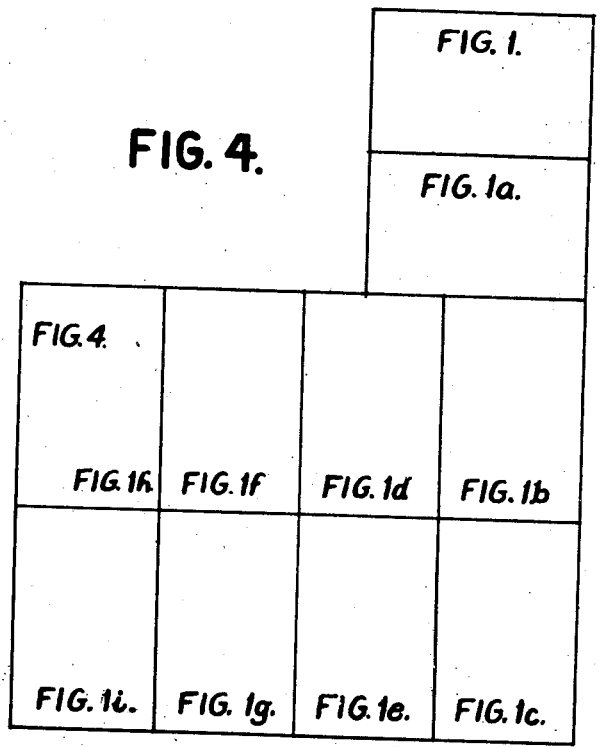
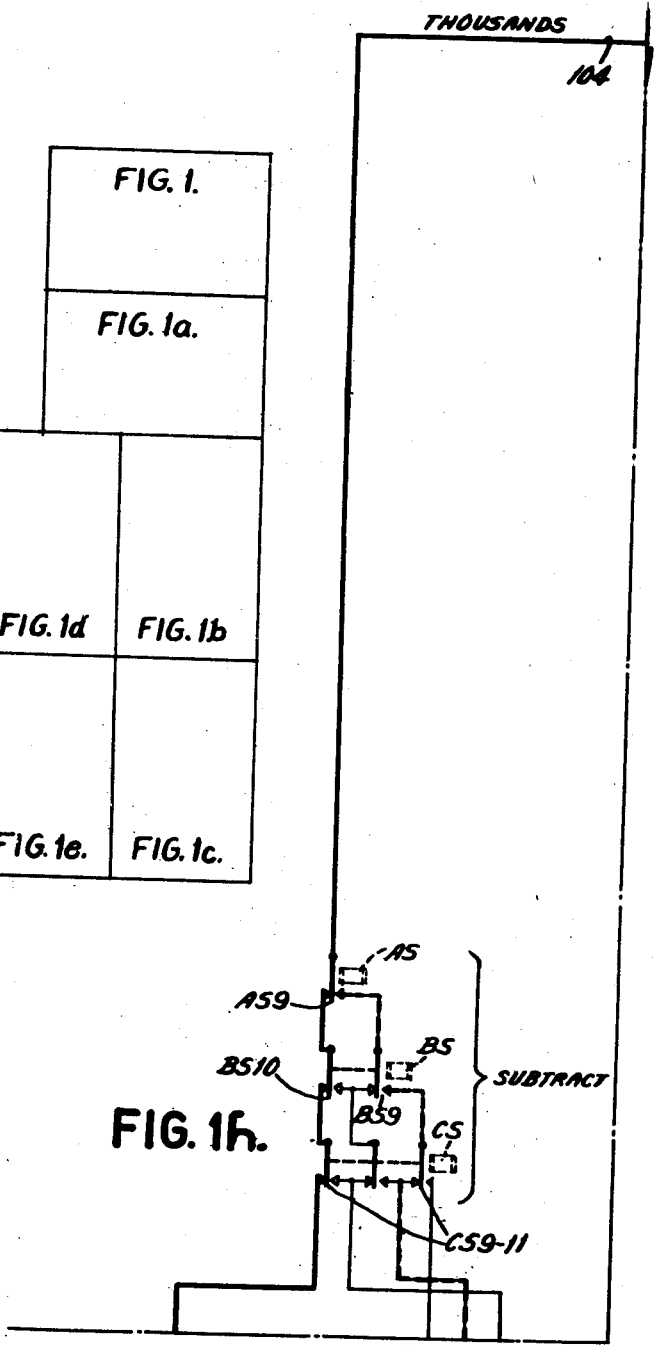

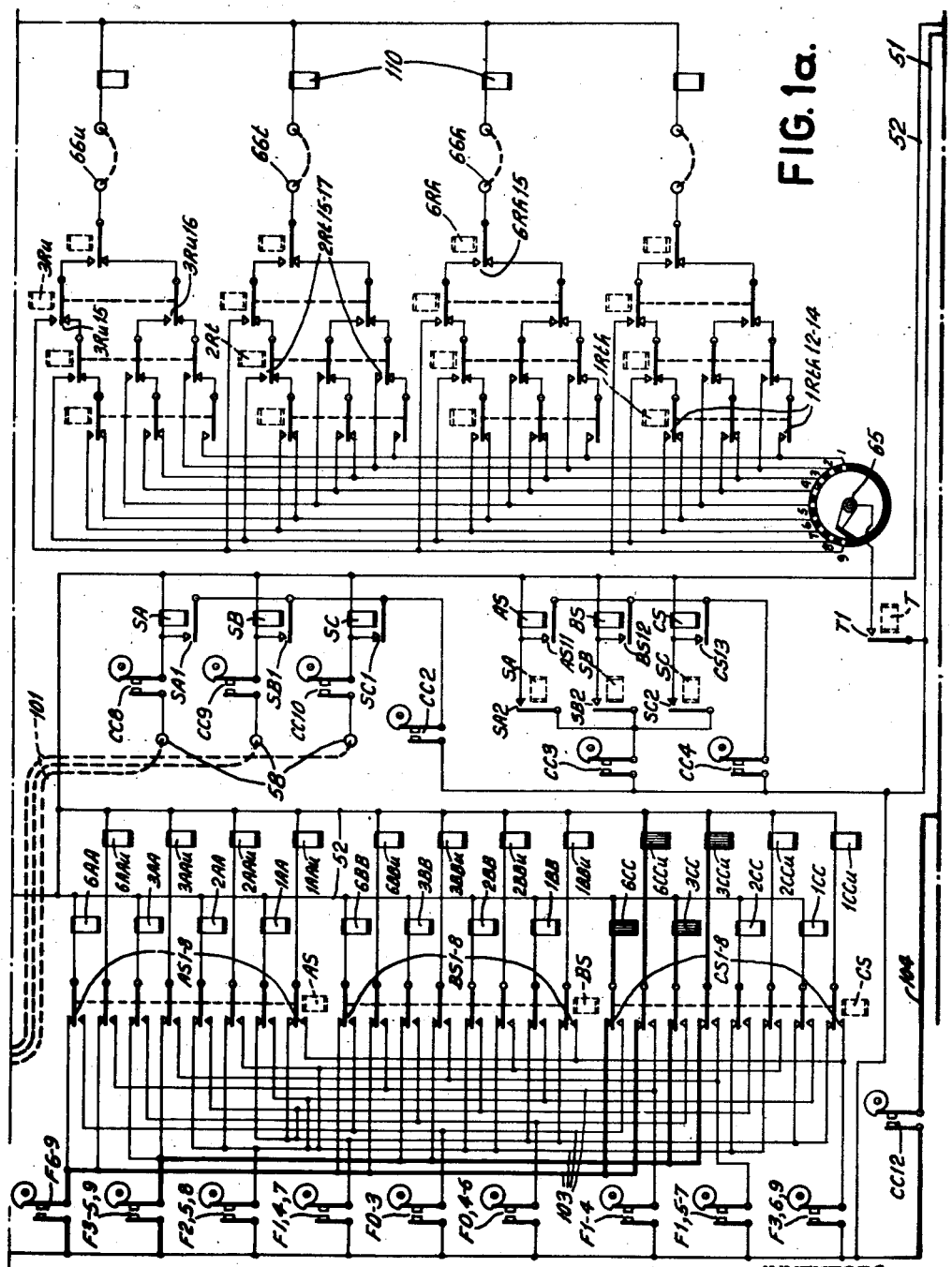

May 6, 1947.  A. H. DICKINSON ET AL  2,420,167
RELAY TYPE CROSS-TOTALIZING DEVICE FOR RECORD CARD DATA
Filed March 31, 1943  11 Sheets-Sheet 11

INVENTORS
ATTORNEY

Patented May 6, 1947

2,420,167

UNITED STATES PATENT OFFICE 2,420,167

RELAY TYPE CROSS-TOTALIZING DEVICE FOR RECORD CARD DATA

Arthur H. Dickinson, Scarsdale, and John N. Wheeler, Hawthorne, N. Y., assignors to International Business Machines Corporation, New York, N. Y., a corporation of New York Application March 31, 1943, Serial No. 481,228

7 Claims. (Cl. 235—61.6)

The present invention relates to record controlled accounting machines and more particularly to the data accumulating mechanism thereof.

The principal object of the present invention is to provide a novel accumulator of the electrical relay type, wherein a plurality of separate amounts may be simultaneously combined to obtain the algebraic sum of such amounts.

A more specific object of the invention resides in the provision of improved tens carry determining devices for a relay accumulator.

In carrying out the objects of the invention, sensing devices are provided which read a record card for three multidenominational amounts perforated in the card and control a relay system in which the amounts are temporarily stored. This relay storage device controls groups of contacts which become adjusted to establish a circuit network, one for each of the multidenominational orders of the mechanism. Included in the network are also sets of contacts adjusted to represent an amount already standing in the accumulator. Also included in the circuit network are groups of contacts for readjusting the network in accordance with tens carry requirements. At a predetermined point of time, after the network has been initially adjusted to represent the sensed amounts and the already entered amount, a single electrical impulse is transmitted through the network of each denominational order. This impulse acts for each order to determine the tens carry requirements, adjusts the network of the next higher order accordingly, and also controls the operation of a register to represent therein the total of the several amounts represented on the sets of contacts.

Provision is made for handling amounts subtractively so that the result entered into the register will represent the algebraic sum of several amounts.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1, 1a, 1b, 1c, 1d, 1e, 1f, 1g, 1h and 1i taken together and arranged in the order shown in the diagram (Fig. 4) constitute a wiring diagram of the electrical circuits of the device.

Fig. 4 is a diagram to show the manner in which the circuit diagram drawings are to be arranged.

Figure 3:
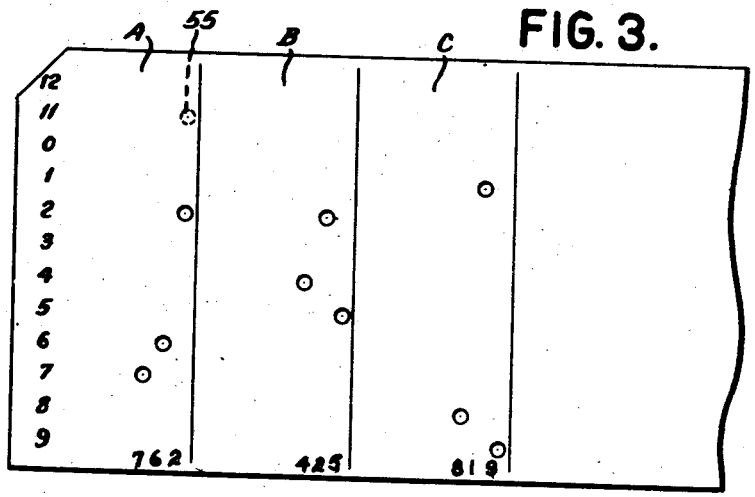
Fig. 3 is a representation of a record card containing three amounts in perforated form, which amounts are to be cross added.

Referring to the drawings, Fig. 3 shows a perforated record card of the well known Hollerith type in which three fields A, B and C are provided to receive punchings in the well known manner representing amounts. In Fig. 3, for example, the three amounts 762, 425 and 819 are perforated in fields A, B and C, respectively. Where the amount in any field is to be subtractively entered, a special perforation designated 55 is made in the 11 index point position of a predetermined column of that field.

Card sensing mechanism

Figure 1:
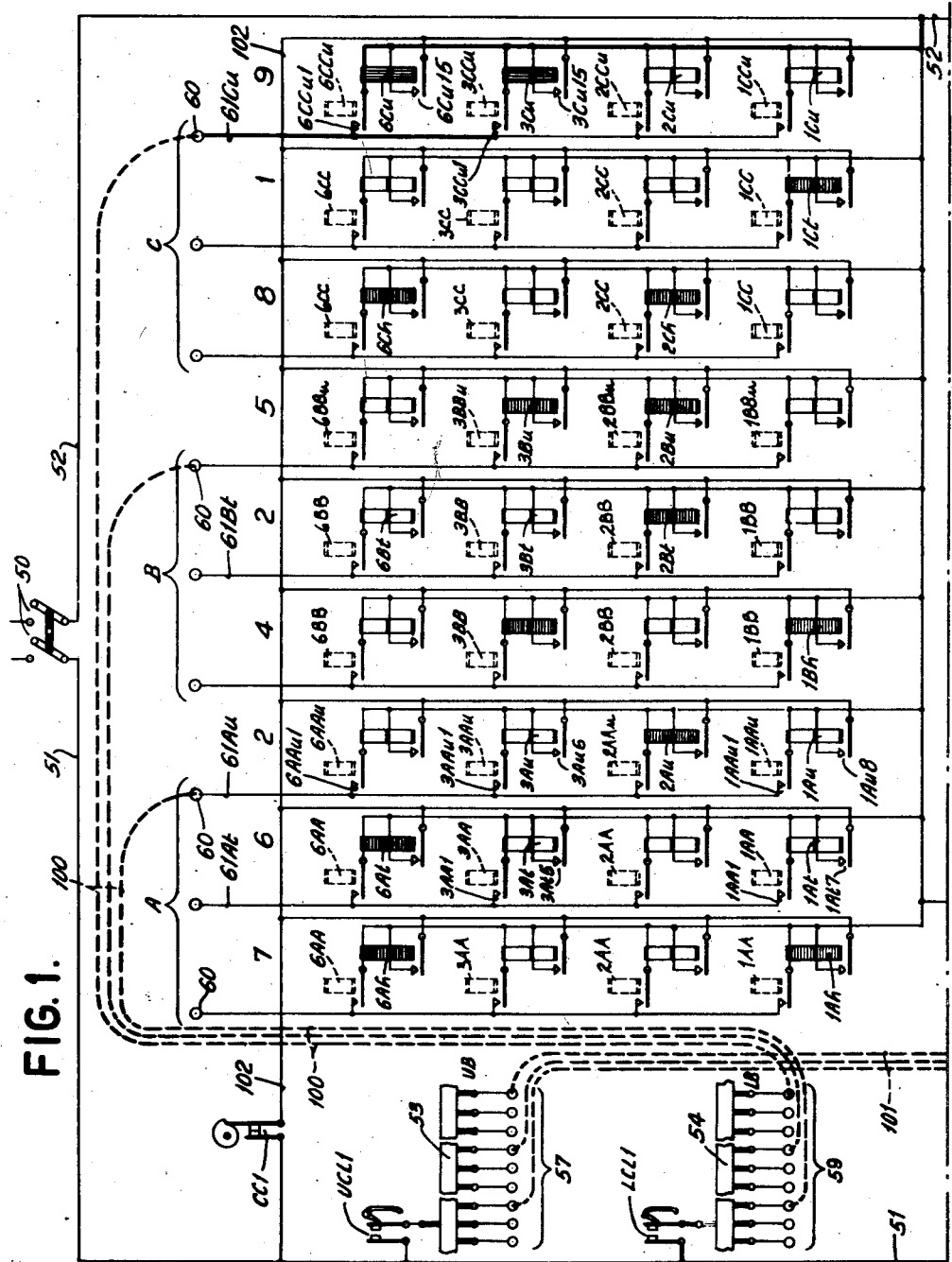

The particular mechanism for feeding record cards through the machine and sensing the perforated data therein form no part of the present invention, and the sensing devices have accordingly been shown in a diagrammatic manner in Fig. 1. Here are shown a row of brushes designated UB and a second row of brushes designated LB. These represent the well known upper and lower sets of sensing brushes found in electrical accounting machines, of which that shown in the patent to C. D. Lake et al., No. 1,976,617, dated October 9, 1934, is representative.

As disclosed in this patent, provision is made for feeding record cards past the upper brushes UB and then past the lower brushes LB in succession so that, when any index point position of a card is at the lower brushes, the corresponding index point position of the next following card is at the upper brushes. The upper brushes cooperate with the special perforation 55 in the card to ascertain whether an amount is to be entered additively or subtractively. The lower brushes sense the perforations representing the amount to enter the amount into a storage device in combinational form. As a preliminary, plug connections designated 100 are made between the plug sockets 59 (Fig. 1) and the plug sockets designated 60, of which only those in the units order of each amount are shown. Further plug connections 101 are made from plug sockets 57 of the brushes, which traverse the card column in which the special perforation 55 may be made, to plug sockets 58.

Figure 2:
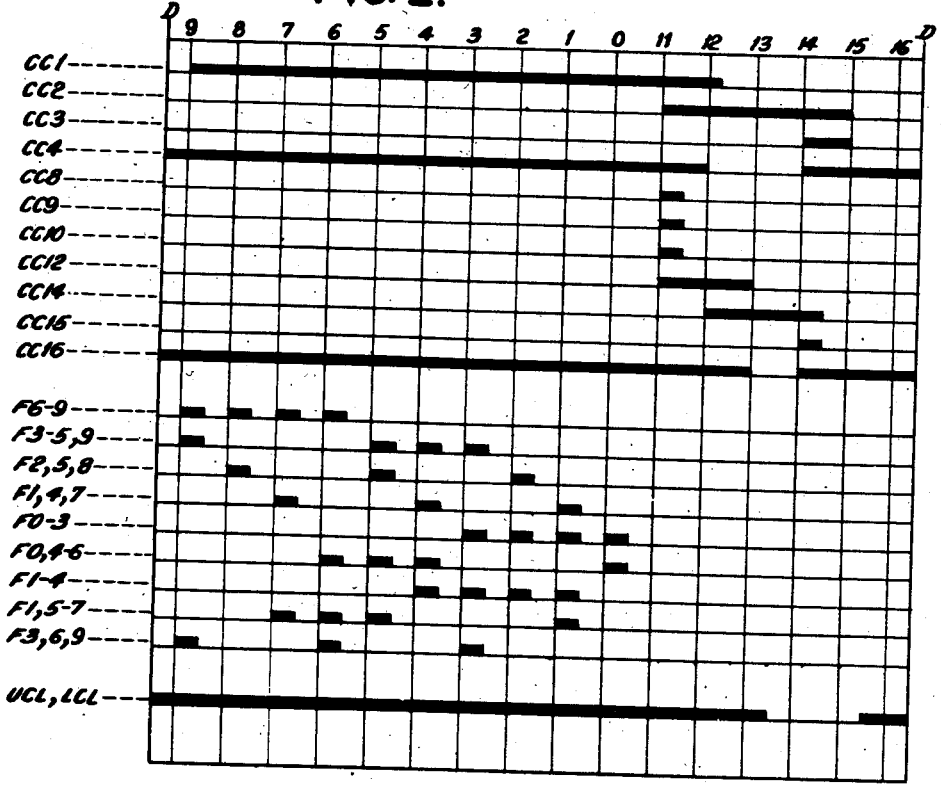
Fig. 2 is a timing diagram of the several cam controlled contacts shown in the wiring diagram.

The machine of the above mentioned patent is known as a cyclically operating machine, that is, for each cycle of operation the record card completely passes the set of brushes LB, and each cycle is subdivided into sixteen points as indicated in the timing diagram (Fig. 2). The designations at the top of the chart represent the time in the cycle when the related index point positions of the card column pass the sensing brushes LB and UB. On the circuit diagram there is represented a number of cam controlled contacts prefixed CC and F, and the timing of these contacts is shown in Fig. 2.

It may be pointed out that in the circuit diagram various relay magnets are shown at points remote from the contacts which they control. This has been done to simplify the wiring connections, and to clearly identify related parts the magnets have been shown in dotted outline adjacent the contacts they control. Further than this, the contacts are designated with the same reference character as the magnet suffixed by a numeral.

In explaining the operation of the device and in tracing the circuits, the specific example involving the three amounts perforated in the card of Fig. 3 will be employed to show how these amounts are sensed and cross added. It is assumed, first, that these amounts are all positive, so that no special perforation 55 is involved, and no circuits would be completed as the card passes the upper brushes. As it passes the lower brushes, the three amounts will be sensed and translated into the combinational code which may be termed a four position code, in which the four positions have the values 1, 2, 3 and 6.

In Fig. 1 are shown a number of vertical columns of four relays each, there being one column for each of the columns of the record card sensed. In each column the relay is designated with the prefix 1, 2, 3 or 6 to designate its code value followed by a letter A, B or C to designate whether it is related to the amount A, B or C, and this letter is followed by a lower case letter $u$, $t$, or $h$ to designate the denominational order of the amount. With the main line switch 50 (Fig. 1) closed, current is supplied to lines 51 and 52 and, as the card passes brushes LB, the several contacts prefixed F (Fig. 1a) close at the time shown in Fig. 2 to energize translating or converting relays designated 1CC, 2CC, 3CC, 6CC, 1BB, 2BB, etc. Examination of Fig. 2 together with Fig. 1a will show that relays 6AA, 6AAu, 6BB, 6BBu, 6CC and 6CCu are energized at the 9, 8, 7, and 6 times in the cycle through cam contacts F6—9. Relays 3AA, 3AAu, 3BB, 3BBu, 3CC and 3CCu are energized at the 9, 5, 4 and 3 times. Relays 2AA, 2AAu, 2BB, 2BBu, 2CC or 2CCu are energized at the 8, 5 and 2 times. Relays 1AA, 1AAu, 1BB, 1BBu, 1CC and 1CCu are energized at the 7, 4 and 1 times.

For each of the relays AA, BB, and CC there is a companion relay wired in parallel therewith and designated by the same reference character followed by the suffix $u$ and, so long as relay contacts AS1—8, BS1—8, and CS1—8 remain in the position shown in Fig. 1a, the pairs of related relays will be concurrently energized under control of the F cams. These relays, when energized, close contacts in Fig. 1 where the contacts are designated with the same reference character as the controlling relay, followed by the numeral 1.

Tracing the specific circuit for the units digit of the C amount of Fig. 3, which digit is 9, when the 9 perforation in the card is at the brushes LB, which is the 9 time in the cycle, the circuit is completed as follows: from line 51 (Fig. 1), through the usual card lever contacts LCL1 (closed while the card is traversing the brushes), contact roll 54, the 9 perforation in the units column of field C of the card, the right hand sensing brush LB, the right hand plug socket 59, plug connection 100 to the right hand socket 60, relay contacts 6CCu1, relay 6Cu, to line 52.

There is a parallel circuit branching from socket 60, through relay contacts 3CCu1 to the relay 3Cu, to line 52, so that these two relays are concurrently energized and will close their associated contacts 6Cu15 and 3Cu15 to provide a holding circuit traceable for relay 6Cu from line 52, relays 6Cu, contacts 6Cu15, wire 102, cam contacts CC1, to line 51. These cam contacts are closed until the 12 point in the cycle (see Fig. 2). From Fig. 2 it is noted that at the 9 time the contacts F3—5, 9 are closed completing a circuit from line 51 (Fig. 1a), the second from the left of a group of vertical wires generally designated 103, two of the contacts CS1—8, relays 3CC, 3CCu, to line 52. Concurrently, the circuit is traceable from line 51, contacts F6—9, the left hand vertical wire 103, the contacts CS1—8, and magnets 6CC and 6CCu in parallel to line 52. These circuits have been emphasized in heavy lines to facilitate their tracing.

Thus, at the 9 time the magnets 3CC, 6CC, 3CCu, and 6CCu are energized so that their contacts, through which the reading circuit above was traced, are closed at the 9 time. In this manner the 9 hole sensed in the card is converted into a coded representation indicated by the energization of the 6C and 3C magnets. In like manner at the 8 and 1 times in the cycle the appropriate magnets are energized to translate the card reading and enter it in coded form on the relays of Fig. 1. In this figure the relays energized in accordance with the amounts perforated in the card of Fig. 3 are shaded to indicate what ones are energized and held through the holding contacts CC1.

Figure 1B:
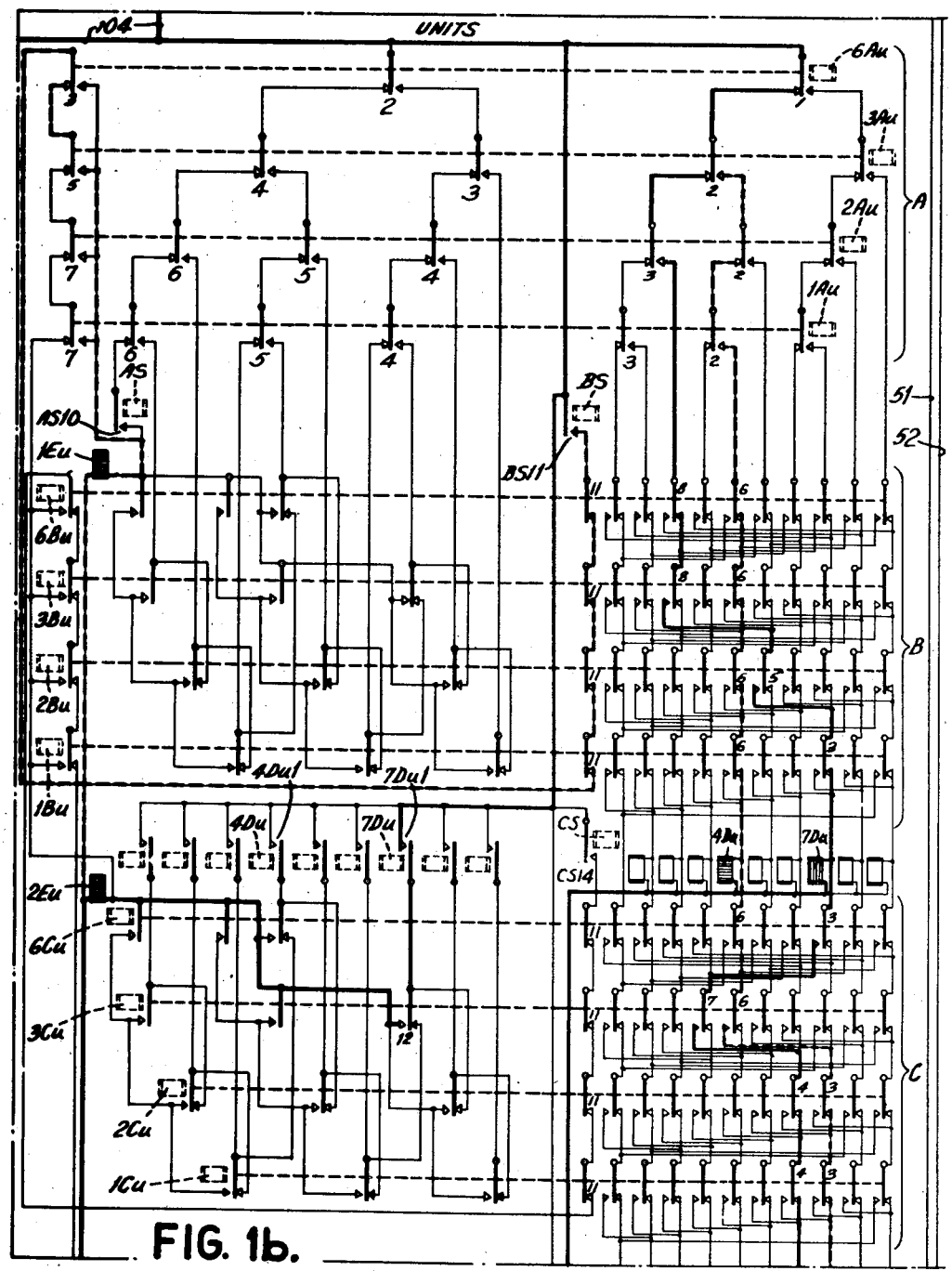
Figure 1C:
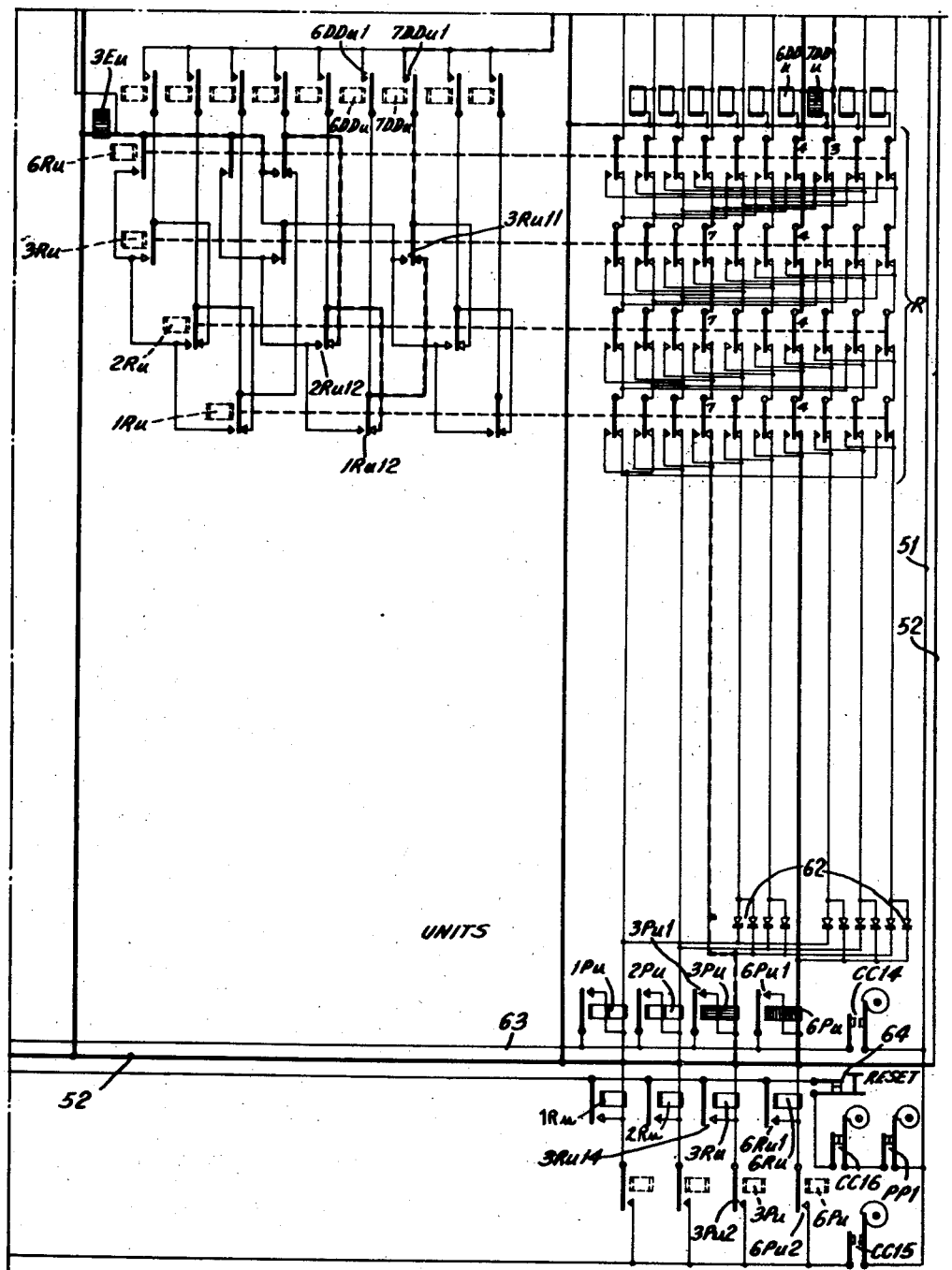
Figure 1D:
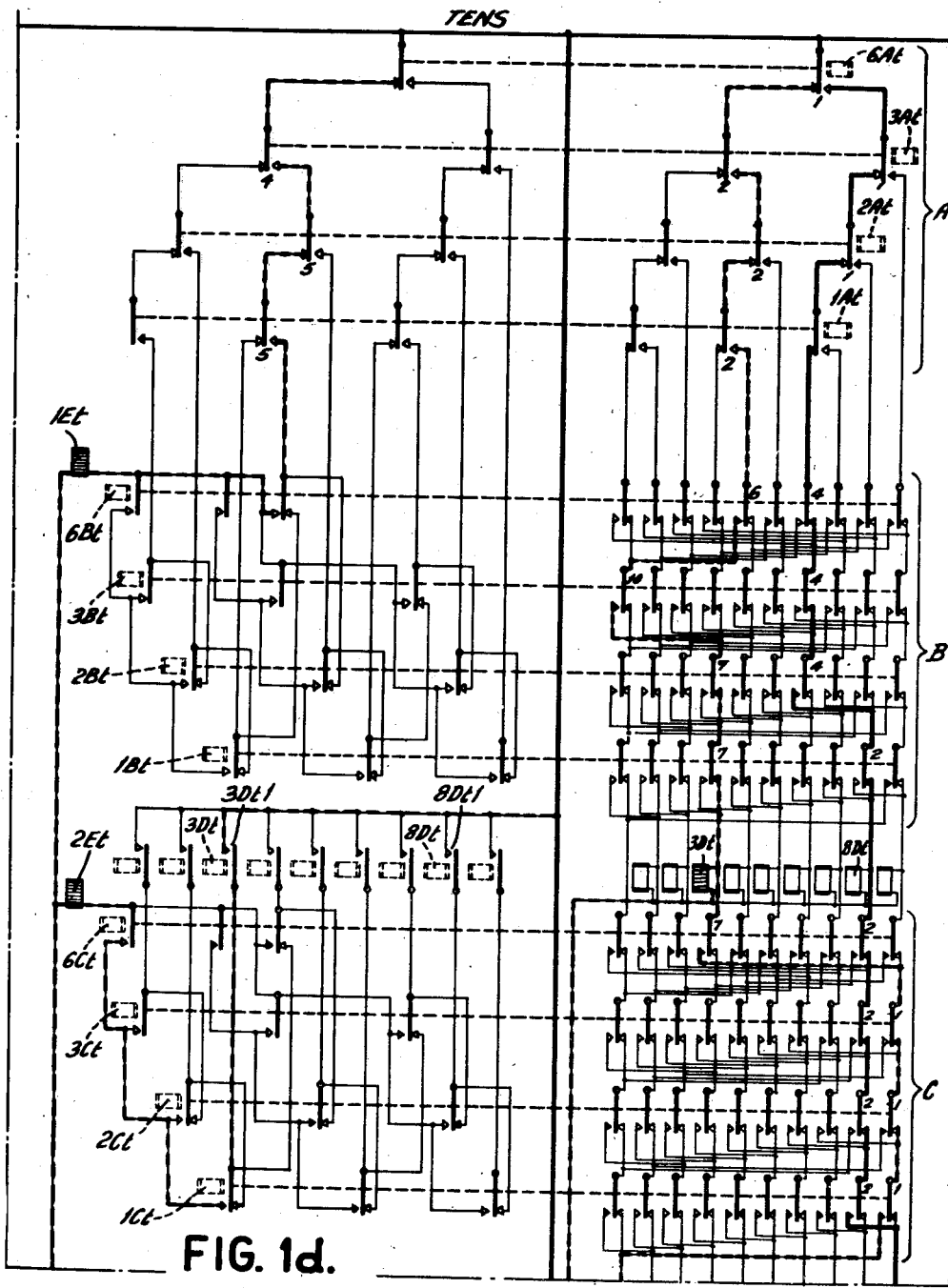
Figure 1E:
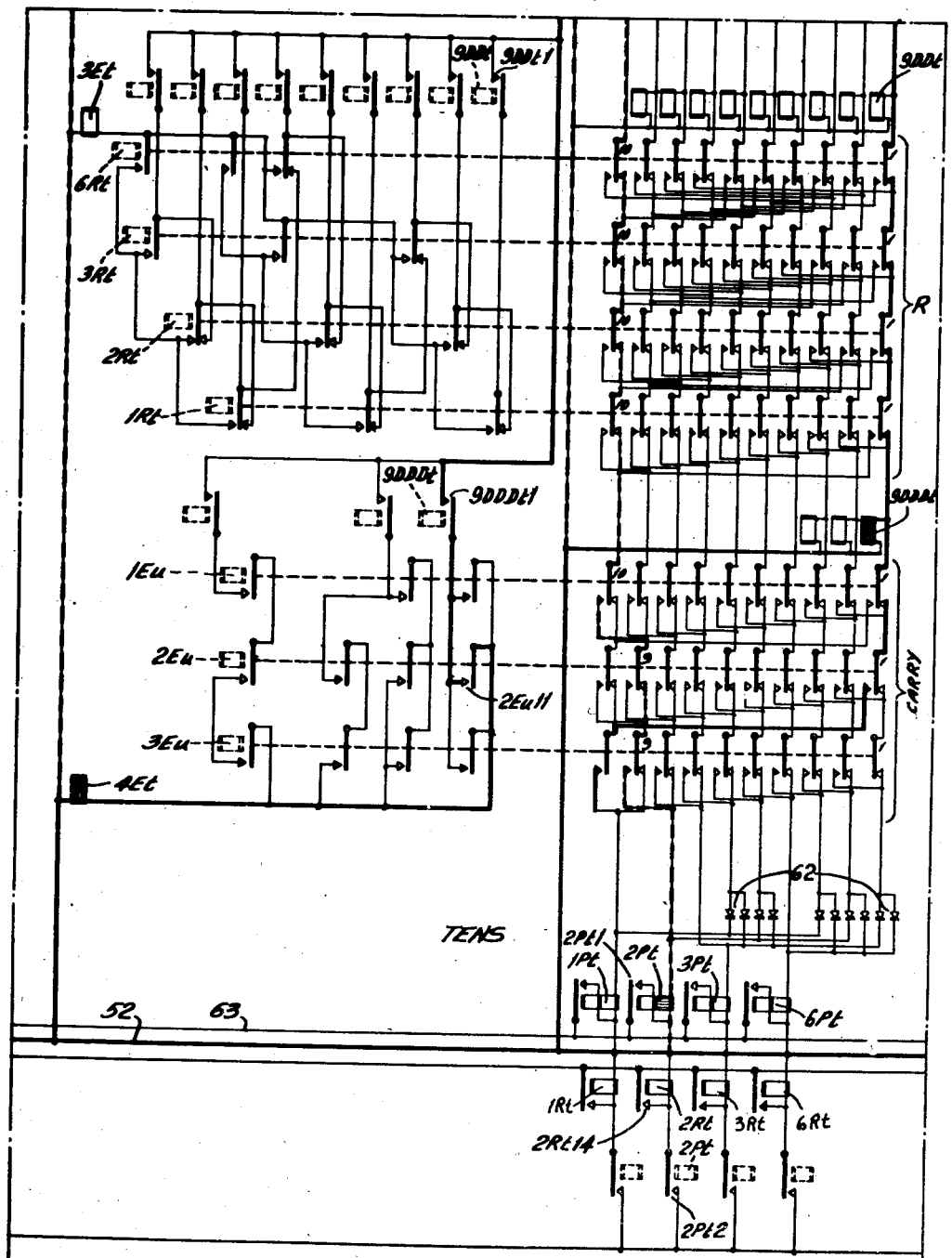
Figure 1F:
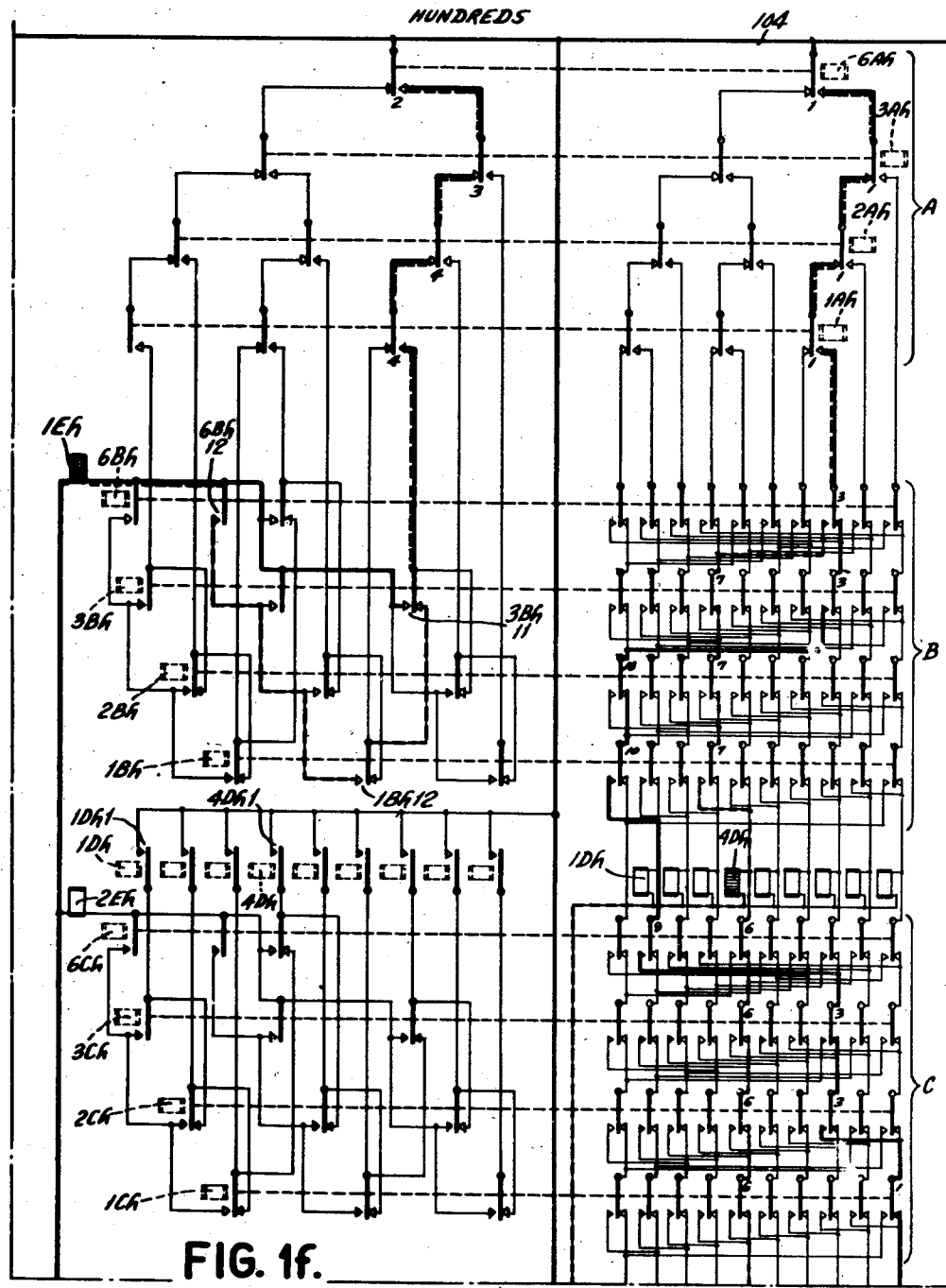

Referring to Figs. 1b, 1d and 1f, the relays of Fig. 1 each control a group of contacts as indicated. These contacts are grouped in the diagram, with those related to the A amount extending horizontally across the upper part of the figure, those related to the B amount across the central part of the figure, and those related to the C amount across the lower part of the figure. The contacts related to the units digits are arranged in a vertical column in Fig. 1b, those related to the tens digits arranged in another vertical column in Fig. 1d, and those related to the hundreds digits are arranged in a third vertical column in Fig. 1f, so that taking Fig. 1b, for example, the energization of the relays 3Cu and 6Cu in response to the energization of the units digit 9 of amount C, will cause the group of contacts to the right of these relays (Fig. 1b) to be shifted from the position shown. Likewise, as a result of sensing the 5 digit in the units order of the amount B, relays 3Bu and 2Bu will be energized and their related contacts shifted. Finally, for the 2 digit in the units order of the A amount, the relay 2Au will be energized and its related set of contacts shifted. In a similar manner the sets of contacts in Figs. 1d and 1f will be adjusted in accordance with the tens and hundreds digits of the three amounts sensed.

After the setup relays of Fig. 1 hav been energized and while they are still held, cam contacts CC12 (Fig. 1a) close (see also Fig. 2) and upon such closure circuits will be simultaneously completed as emphasized in heavy lines in Figs. 1b to 1i. These several concurrent circuits will now be separately traced to point out their functions. Beginning with the circuit through Fig. 1b, this is traceable from line 51 (Fig. 1a), contacts CC12, wire 104 (Fig. 1b), the 1 contacts of relay 6Au, the 2 contacts of relay 3Au, the 3 contacts of relay 2Au (now shifted), the 8 contacts of relay 6Bu, the 8 contacts of relay 3Bu (now shifted), the 5 contacts of relay 2Bu (now shifted), the 3 contacts of relay 1Bu, the 3 contacts of magnet 6Cu (now shifted), the 7 contacts of relay 3Cu (now shifted), the 4 contacts of relay 2Cu, the 4 contacts of relay 1Cu, the 4 contacts of relay 6Ru (Fig. 1c), the 4 contacts of further relays 3Ru, 2Ru and 1Ru in succession, relay 6Pu, to line 52.

The relays 1Ru to 6Ru represent the units order of the register into which the ultimate result is to be entered, and for the present purposes it is assumed that no initial entry is contained in this register, so that none of the relays 1Ru to 6Ru are energized, and the related contacts are accordingly in the positions shown, through which the circuit has just been traced. The relay 6Pu is a part of the group of four relays designated 1Pu, 2Pu, 3Pu and 6Pu which constitute the units order of an intermediate register for receiving the summation of the units digits. As noted from Fig. 3, the units digits of the three amounts are 2, 5, and 9 whose sum is 16. The energization of relay 6Pu accordingly registers the units digit of this sum, and it is apparent that a tens carry of one unit is to be effected into the next higher order, the manner of which will be presently explained.

When relay 6Pu became energized, it closed its contacts 6Pu (Fig. 1c) which provides a holding circuit which, however, does not pick up until cam contacts CC14 close a cycle point after cam contacts CC12 close (see Fig. 2). Upon such closure, the holding circuit is completed from line 51, contacts CC14 (Fig. 1c), contacts 6Pu1, relay 6Pu, to line 52. Inspection of the circuit connections extending through the sets of contacts (Figs. 1b and 1c) show that the wiring is arranged in accordance with the table of addition so that, with the A, B, C, and R sets of contacts adjusted to represent any of the digits, the 1Pu, 2Pu, 3Pu and 6Pu relays will be energized to represent the units digit of the sum of the digits set on the contacts.

Referring now to Figs. 1d and 1e, the tens digits of the three amounts, namely, 6, 2 and 1, are set on the A, B and C sets of contacts and, when cam contacts CC12 close, the circuit is traceable from line 51 (Fig. 1a), through contacts CC12, wire 104 (Figs. 1b and 1d), the 1 contacts of relay 6At (now shifted), the 1 contacts of relay 3At, the 1 contacts of relay 2At, the 1 contacts of relay 1At, the 4 contacts of relay 6Bt, the 4 contacts of relay 3Bt, the 4 contacts of relay 2Bt (now shifted), the 2 contacts of relay 1Bt, the 2 2 contacts of relay 6Ct, the 2 contacts of relay 3Ct, the 2 contacts of relay 2Ct, the 2 contacts of relay 1Ct (now shifted), the 1 contacts of relay 6Rt, 3Rt, 2Rt, 1Rt in succession (Fig. 1e), the 1 contacts of relay 1Eu, the 1 contacts of relay 2Eu (now shifted as a result of a carry from the units order), to the 10 contacts of relay 3Eu.

At this point the circuit is incomplete inasmuch as the sum of the three tens digits 6, 2 and 1 plus a carry from the units order results in a zero as the units digit of this sum, so that the 1P—6P relays in this order are not energized.

Referring back to Fig. 1b, a circuit parallel to the adding circuit already traced will energize a relay designated 7Du through the connections emphasized in heavy lines. Thus, the relay 7Du closes a pair of contacts 7Du1 through which the further heavy line circuit in Fig. 1b is traceable from wire 104, contacts 7Du1 (now shifted), the 12 contacts of relay 3Cu (now shifted), relay 2Eu to line 52 (Fig. 1c). In Fig. 1b there is also shown a carry relay designated 1Eu and in Fig. 1c is shown a third carry relay designated 3Eu. The wiring is such that, whenever the sum of the A and B digits in the units order is 10 or greater, the relay 1Eu becomes energized. The relay 2Eu becomes energized whenever the sum of the digits representing the sum of the units digit comprising the A and B amounts and the units digit of the C amount is 10 or greater, while relay 3Eu becomes energized whenever the sum of the units digits of the A, B and C amounts and the units result digit set on the 1R—6R relays is 10 or greater.

Accordingly, since the sum of the A digit 2 and the B digit 5 is only 7, relay 1Eu is not energized for the example chosen. Also, since the sum of 6 and 0 (units order result digit concurrently standing in the R relays) is 6, relay 3Eu remains deenergized. Thus, for the units order represented in Figs. 1b and 1c, upon closure of cam contacts CC12 two parallel circuits are completed, one to energize the relay 6Pu and the other to energize the carry relay 2Eu.

Referring now to Figs. 1d and 1e and the wiring for the tens order, it has been pointed out that no P relay is energized, since the units digit of the sum is 0. However, the partially traced circuit branches as indicated in heavy lines to energize a relay designated 9DDDt which closes a pair of contacts 9DDDt1, enabling the completion of the second heavy line circuit through Figs. 1d and 1e to energize relay 4Et. Relay 4Et becomes energized whenever the sum of the tens order digits comprising the A, B, C and R amounts and a carry increment from the units order is either 10 or greater or 20 or greater. The relays 1Et, 2Et (Fig. 1d) and the relay 3Et (Fig. 1e) becomes energized for a condition of carry in the tens order, which are similar to the relays 1Eu, 2Eu and 3Eu in the units order (Figs. 1b and 1c) described above. Relay 4Et shifts contacts shown in Fig. 1g of the hundreds order, and in this order it will be noted that the A digit is 7, the B digit 4 and the C digit 8, totaling 19, which with the units carry from the tens order amounts to 20.

Figure 1G:
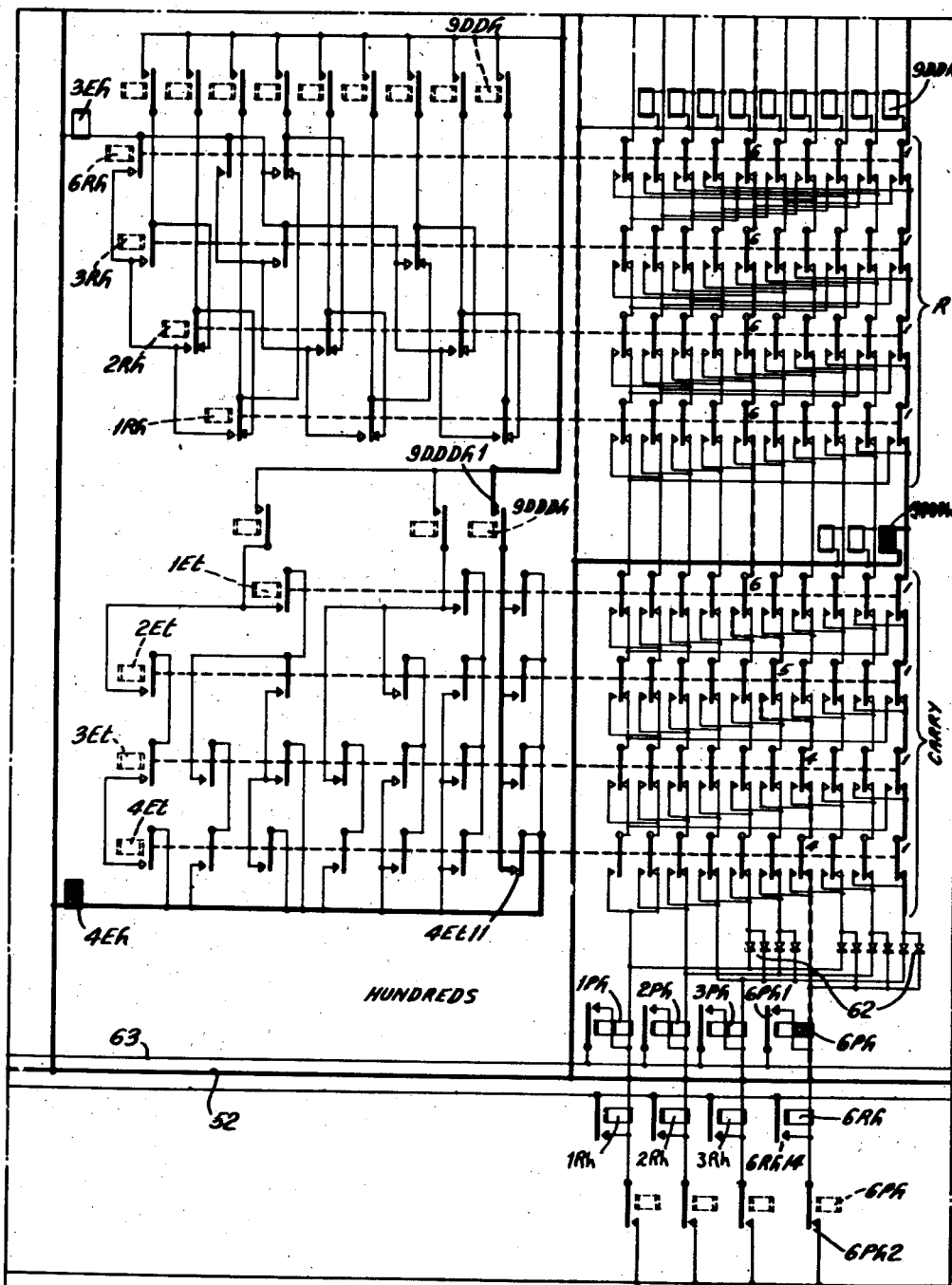

Accordingly, the heavy line circuit extending through the relays in the hundreds order is incomplete so that none of the P relays in this order are energized, but a branch circuit also emphasized in heavy lines will energize relay 9DDDh, causing it to close its contacts 9DDDh1, through which a second heavy line circuit is traceable across Figs. 1f and 1g to energize relay 4Eh. Since the A and B digits in the hundreds order, namely, 7 and 4, total more than 10, the relay 1Eh (Fig. 1f) is also energized through the emphasized circuit traceable from wire 104 (Fig. 1f), the 2 contacts of relay 6Ah (now shifted), the 3 contacts of relay 3Ah, the 4 contacts of relay 4Ah, the 4 contacts of relay 1Ah (now shifted), the 11 contacts of relay 3Bh (now shifted), relay 1Eh to line 52.

Figure 1I:
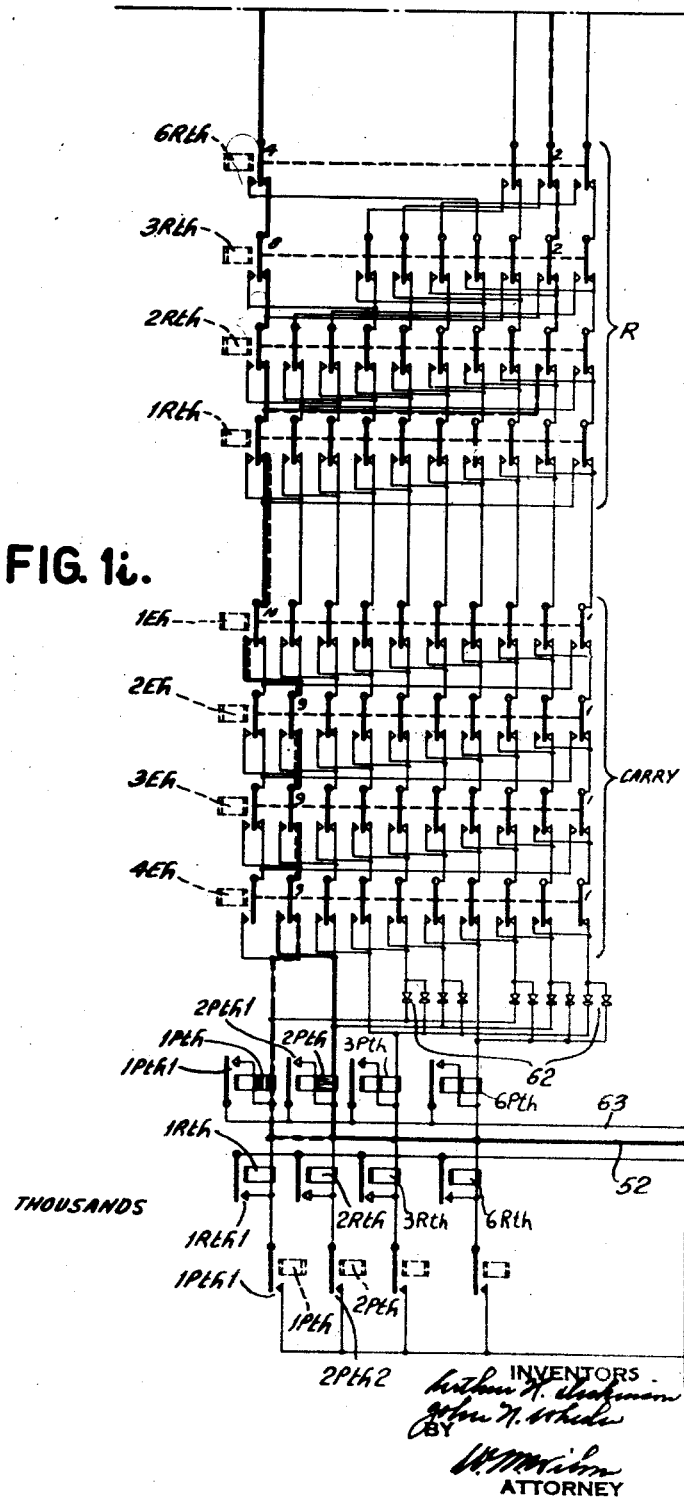

The relays 1Eh and 4Eh shift related sets of contacts shown in Fig. 1i, so that concurrently with all the other circuits traced a circuit emphasized in heavy lines in Figs. 1h and 1i is traceable from wire 104 (Fig. 1h), through left hand contacts of relays designated AS, BS and CS to the 4 contacts of relay 6Rth (Fig. 1i), the 8 contacts of relay 3Rth, the 10 contacts of relay 2Rth, the 10 contacts of relay 1Rth, the 10 contacts of relay 1Eh (now shifted), the 9 contacts of relay 2Eh, the 9 contacts of relay 3Eh, the 9 contacts of relay 4Eh (now shifted), the relay 2Pth, to line 52. Thus, a 2 is set on the P relays in the thousands order. This P relay closes its related contacts 2Pth1 to provide a holding circuit through the contacts CC14 in Fig. 1c.

Thus, upon closure of cam contacts CC12 the several circuits traced and emphasized in heavy lines are completed to energize the P relays to represent the total 2006 which is the sum of the three amounts A, B and C.

It is to be noted that the circuits through higher orders are in some cases dependent upon prior completion of circuits in lower orders, especially if there are carry requirements. In such cases, due to electrical characteristics of the circuits the P relays in a higher order will become energized before the carry relay has been energized for that order. This is taken care of by preventing completion of the holding circuit for the P relays until a cycle point after the contacts CC12 have closed (see Fig. 2). Within this cycle point the circuit network will have become adjusted or balanced so that just before the holding contacts CC14 close, all the relays representing values to be added will be in proper position, and only those circuits representing the correct total will be completed, so that when contacts CC14 close, the proper P relays will be held energized until these contacts again open.

The next step involves transfer of the amounts from the P relays to the set of R relays shown at the bottom of Figs. 1i, 1g, 1e and 1c. This is effected upon closure of cam contacts CC15 which, as seen in Fig. 2, close before cam contacts CC14 open and is brought about in the following manner: the P relays close contacts suffixed with the reference numeral 2; for example, in Fig. 1c the relay 6Pu closes a pair of contacts 6Pu2 so that, when cam contacts CC15 close, a circuit is traceable from line 51, contacts CC15, contacts 6Pu2, relay 6Ru to line 52. Energization of relay 6Ru will shift the related set of contacts in Fig. 1c and will also close a pair of holding contacts 6Ru1 which will keep the relay energized through a holding circuit from line 52, relay 6Ru, contacts 6Ru1, 64, CC16 and PP1 to line 51, until contacts CC16 open in the next cycle at the time designated in Fig. 2.

Briefly reviewing the operations of cross adding three amounts from the record card, the three amounts are sensed and converted into combinational settings on the relays of Fig. 1 which effect adjustment of the adding network. This adjustment takes place while the card is passing the lower sensing brushes at the 11 time in the cycle (see Fig. 2), and upon closure of the contacts CC12 parallel circuits are completed, one through each of the denominational orders of the device, which will energize the sets of P relays which might be termed an intermediate register, in accordance with the sum of the amounts sensed on the card plus whatever amount may be standing on the R sets of contacts. Thereafter, the setting of the P relays is transferred to R relays which may be termed the result accumulator, and the record controlled relay set-up of Fig. 1 is cleared.

*Subtracting operations*

As explained above, whenever an amount is to be subtractively entered, the special designation 55 (Fig. 3) is made in a predetermined column of the related field. This perforation is sensed by the upper brushes UB before amount perforations are sensed by the lower brushes LB, and a circuit is completed from line 51 (Fig. 1), upper card lever contacts UCL1, contact roller 58, the 11 hole in the card, related brush UB, plug socket 57, one of the plug connections 101 (Fig. 1a), to socket 59, thence through either contacts CC8, CC9 or CC10 to energize one of the relays SA, SB or SC and thence to line 52. These relays close related contacts suffixed 1 which provide a holding circuit through cam contacts CC2. These relays also close contacts suffixed 2, through which circuits are completed when cam contacts CC3 close to energize relays AS, BS or CS, according to whether there are special perforations in the A, B, or C field. The AS, BS and CS relays in turn close contacts AS11, BS12, or CS13, respectively, to provide a holding circuit therefor through cam contacts CC4, which will hold the relays energized throughout the entering portion of the next cycle, that is, while the card passes the lower brushes. The relays AS, BS and CS shift the contacts designated AS1—8, BS1—8 and CS1—8 in Fig. 1a, and as a result the F cam contacts now energize the AA, BB and CC relays so that the amount sensed by the lower brushes will be set up on the relays of Fig. 1 with the units order digit complemented to 10 and the other orders complemented to 9.

Considering the specific amount —256 perforated in the A field of the card, then as the card passes the upper brushes the special perforation will cause energization of relay SA (Fig. 1a), and in turn relay AS will be energized and shaft its related contacts AS1—8. At the 6 time in the cycle, when the units digit of the amount is sensed, relays 3AAu and 1AAu will be energized through circuits traceable from line 51 (Fig. 1a), contacts F1, 5—7, the 4 contacts controlled by relay AS (now shifted) and relay 3AAu. Concurrently, a circuit is traceable from line 51, contacts F3, 6, 9, the 8 contacts of relay AS (now shifted), relay 1AAu to line 52. These two relays close their contacts 3AAu1 and 1AAu1 in Fig. 1a to effect energization of the relays 3Au and 1Au in accordance with the tens complement of 6.

At the 5 time in the cycle, relays 3AA and 1AA (Fig. 1a) will be energized through cam contacts F0, 4—6, and contacts F2, 5, 8 as may be readily traced, which results in the energization of the relays 3AT and 1AT in Fig. 1 to represent the 9's complement of the digit 5. Finally, at the 2 time in the cycle relays 6AA and 1AA will be energized, resulting in the energization of the relays 6Ah and 1Ah representing the 9's complement of 2.

Assuming a B amount of —200 perforated in the B field, then through circuits similar to those explained the relays in Fig. 1 related to the B amount will be set to represent the valve 790, wherein 7 is the 9's complement of 2 in the hundreds order, 9 is the 9's complement of the 0 in the tens order, and 0 is the units digit of the tens complement of the 0 in the units order. The tens digit of the complement of 0 (which is 10) is added into the tens order in a manner to be subsequently explained, so that in the initial conversion if there is a 0 in the units order of the amount to be subtracted, no relays are energized in the units order of Fig. 1.

Assuming further that the amount 073 is perforated in the field, then as already explained the C magnets of Fig. 1 will be energized to represent this amount directly. It is also assumed that the R relays are energized in accordance with the last result obtained, namely, 2006. Under the foregoing assumptions the various relays are energized in accordance with the following table at the time that cam contacts CC12 close.

*Table I*

| | Amount | Relays | | | |
|---|---|---|---|---|---|
| | | Thousands | Hundreds | Tens | Units |
| A | −256 | | 6Ah<br>1Ah | 3At<br>1At | 3Au<br>1Au |
| B | −200 | | 6Bh<br>1Bh | 6Bt<br>3Bt | |
| C | 073 | | | 6Ct<br>1Ct | 3Cu |
| R | 2006 | 2Rth | | | 6Ru |

The algebraic sum of these four amounts is 1623 and, upon closure of cam contacts CC12, circuits will be completed simultaneously through the several denominational order branches of the network in Figs. 1b to 1i to energize the P relays in accordance with this algebraic total. In Figs. 1b to 1i the circuits which are effective for obtaining this total are emphasized in heavy broken lines. It will be noted that they pass through relay 1Pth (Fig. 1i), relay 6Pth (Fig. 1g), relay 2Pt (Fig. 1e) and relay 3Pu (Fig. 1c). The circuit for energizing relay 3Pu is traceable from contacts CC12 (Fig. 1a), wire 104 (Fig. 1b), the 1 contacts of relay 6Au the 2 contacts of relay 3Au (now shifted), the 2 contacts of relay 2Au, the 2 contacts of relay 1Au (now shifted), the 6 contacts of the relays 6Bu, 3Bu, 2Bu and 1Bu in turn, the 6 contacts of relay 6Cu, the 6 contacts of relay 3Cu (now shifted), the 3 contacts of relays 2Cu and 1Cu, the 3 contacts of relays 6Ru (now shifted), the 7 contacts of relay 3Ru, 2Ru and 1Ru to relay 3Pu, and thence to line 52. The sum of these units digits 4, 3 and 6 is 13, requiring a tens carry, so that relay 7DDu (Fig. 1c) is energized through a parallel circuit which will cause closure of contacts 7DDu1, through which the emphasized circuit will be completed to energize carry relay 3Eu, to shift the related contacts in the tens order (Fig. 1e).

As pointed out above by reference to Table I, it is to be noted that the B amount of −200 was entered on the set of relays as 790. In order to correct this amount to the true complement 800, an additional carry increment of 1 is applied to the tens order in the following manner: upon closure of contacts CC12 (Fig. 1a), a circuit is completed from line 51, contacts CC12 (Fig. 1a), wire 104 (Fig. 1b), contacts BS11 (now shifted as a result of the sensing of the negative designation in the card), the 11 contacts 6Bu, 3Bu and 1Bu, the 3 contacts 6Au, the 5 contacts 3Au (now shifted), and carry relay 1Eu to line 52. This causes shifting of the contacts of the relay 1Eu in Fig. 1e.

In the tens order the entering circuit is traceable from wire 104 (Fig. 1d), the 1 contacts 6At, the 2 contacts 3At (now shifted), the 2 contacts 2At, the 2 contacts 1At (now shifted), the 6 contacts 6Bt (now shifted), the 10 contacts 3Bt (now shifted), the 7 contacts 2Bt and 1Bt, the 7 contacts 6Ct (now shifted), the 1 contacts 3Ct and 2Ct, the 1 contacts 1Ct (now shifted), the 10 contacts 6Rt, 3Rt, 2Rt, and 1Rt, the 10 contacts 1Eu (now shifted), the 9 contacts 2Eu, the 9 contacts 3Eu (now shifted), to relay 2Pt and line 52. Energization of relay 2Pt is the result of the addition of the digits 4, 9 and 7 plus two carry units equaling 22 and requiring that two units be carried into the hundreds order.

Accordingly, through the emphasized circuits the relays 1Et and 2Et (Fig. 1d) become energized to shift their related sets of contacts in Fig. 1g. In the hundreds order the entering circuit is traceable from wire 104 (Fig. 1f), the 1 contacts 6Ah (now shifted), the 1 contacts 3Ah and 2Ah, the 1 contacts 1Ah (now shifted), the 3 contacts 6Bh (now shifted), the 7 contacts 3Bh and 2Bh, the 7 contacts 1Bh (now shifted), the 6 contacts 6Ch, 3Ch, 2Ch and 1Ch, 6Rh, 3Rh, 2Rh and 1Rh, the 6 contacts of relay 1Et (now shifted), the 5 contacts of magnet 2Et (now shifted), the 4 contacts of relay 3Et and 4Et to relay 6Ph and line 52. The sum of the digits 7, 7 plus the two carry units equals 16, indicating the carry of one unit into the thousands order. Accordingly, through the emphasized circuit, relay 1Eh is energized, shifting its contacts in Fig. 1i, so that the circuit through the thousands order of the device is traceable in Fig. 1h from wire 104, the 9 contacts of relay AS (shifted as a results of a negative A amount), the 9 contacts of relay BS (shifted as a result of a negative B amount), the 9 contacts of the relay CS, the 2 contacts of relay 6Rth (Fig. 1i), the 2 contacts of relay 3Rth, the 2 contacts of relay 2Rth (now shifted), the 10 contacts of relay 1Rth, the 10 contacts of relay 1Eh (now shifted), the 9 contacts of relays 2Eh, 3Eh and 4Eh to relay 1Pth and line 52.

It will be noted that in Fig. 1h the AS, BS and CS contacts are wired to add 9's in the thousands order. Inasmuch as no card entries are made in this order (only three entering orders being provided), it is necessary to add a 9 in the thousands order for each subtractive entry, and this is done by the connections shown in Fig. 1h, where it will be observed that energization of any one relay AS, BS or CS will complete a circuit through Fig. 1i to enter a 9. Energization of any two of them will enter an 8 (units digit of 9×2=18) and energization of all three will enter a 7 (units digit of 9×3=27).

As explained for the previous example, the P relays are held energized until their setting has been transferred to the R relays which then are maintained energized in accordance with the new sum 1623, and new amounts may be entered from the following record card in the next cycle.

In the foregoing example, it was explained how the tens complement of a B amount to be subtracted was taken care of through contacts BS11 (Fig. 1b) and the Bu11 contacts to energize carry relay 1Eu which causes the entry of an additional unit in the tens order. Let it be assumed now that the A amount to be subtracted is 200. In such case the relay AS becomes energized as explained so that, when contacts CC12 close to establish the accumulating impulse, a circuit is traceable from these contacts through wire 104 (Fig. 1b), left hand contacts 6Au2, 3Au4, 2Au6, 1Au6 (since no Au relays will be energized), contacts AS10 (now closed) and relay 1Eu to line 52. This causes shifting of the contacts of relay 1Eu in Fig. 1e to add a unit in the tens order. Thus, if the A or B amount has a 0 in the units order, the same relay 1Eu is energized.

Where both the A and B amounts are negative and both have a 0 in the units order, the relay 1Eu is energized just as explained for the A amount alone, but the circuit for the B amount is now traceable from wire 104, contacts BS11, contacts 6Bu11, 3Bu11, 2Bu11, 1Bu11 (all closed for the 0 entry), thence through the left hand contacts 6Au3, 3Au5, 2Au7, 1Au7, to relay 2Eu and line 52. With both relays 1Eu and 2Eu energized, each will add a unit in the tens order.

When the C amount alone is negative and contains a 0 in the units order, relay CS is energized through the sign sensing circuit and the tens carry circuit this time is traceable from wire 104, contact CS14 (Fig. 1b), the 11 contacts 6Cu, 3Cu, 2Cu and 1Cu (all closed) and, if there is any significant setting in the Bu relays, the circuit will go through one of the left-handmost 6Bu, 3Bu, 2Bu or 1Bu contacts to relay 2Eu and line 52. If the B amount is also negative and has a zero in its units order, none of these last contacts will be shifted and the circuit passes serially through their right-hand contacts to relay 2Eu (Fig. 1c) and line 52. It will be thus seen that the carry relays 1Eu, 2Eu and 3Eu are selectively energized in accordance with various conditions requiring carries, and it will be noted that three carries are all that will ever be called for from the units to the tens order. With four significant digits set for A, B, C and D, the greatest carry is 3 (9×4=36) and, if any one of these is 0, the greatest is 2 (9×3=27) plus the complement correcting 1 when the 0 is the result of a negative entry.

It will be appreciated that, when a result digit is 4, 5, 7, 8 or 9, two intermediate result P relays are energized concurrently. To prevent unwanted circuits being completed when only a single P relay is to be energized, that is, for the result digits 1, 2, 3 or 6, unidirectional impedances, such as either cupric oxide or selenium rectifiers 62 (Figs. 1c, 1e, 1g, 1i) are provided. The R relays are provided with sets of contacts shown in Fig. 1a which are wired to an emitter designated 65. These contacts are provided for enabling the amount standing in the R relays to be read out for control of the usual recording devices in the tabulating machine. Such machine, as explained in the patent referred to, may be caused to go through what is known as a total taking cycle, during which the brush of emitter 65 rotates in synchronism with printing devices, and is timed to contact segments in the order 9, 8, 7, 6, etc., as correspondingly valued digits are presented for printing opposite the usual printing platen. Contacts T1 are closed through a magnet designated T, which is energized in any suitable manner when it is desired to read out the amounts standing in the R relays during the total taking cycle.

The arrangement of the R contacts in Fig. 1a is such that for any combinational setting a circuit will be completed through emitter 65 to energize a printing magnet designated 110 at the proper time for printing the related digit.

In Fig. 1c there is shown a pair of cam contacts PP1 which are provided in the total taking mechanism and timed to open after printing has been effected to drop the holding circuits of the R relays, thereby clearing the total. Clearing in the R sets of relays may also be effected by manually opening a pair of contacts 64.

Briefly reviewing the subtracting operation, it will be noted that when any amount on the card is to be subtracted, it is accompanied by the special perforation 55 in Fig. 3 which controls the entering circuits from the card, so that the amount to be subtracted is set up on the relays 51 with the units digit of the amount converted to a tens complements and the higher digits converted to 9's complements. When contacts CC12 close, circuits are completed in substantially the same manner as for the adding of positive values, except that here complements are added. The special adding occurs where the units order of an amount is 0, in which case it is necessary to obtain the tens complement of the tens order. This is taken care of during the adding operation, during which an additional unit is carried into the tens order to round out the complement. For other amounts, i. e. amounts whose unit digit is other than zero, the value to be subtracted is converted into its true tens complement, and this complement added as though it were a positive amount.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination, a register settable to represent a multidenominational amount, a group of contact sets, one set for each denominational order of the register, adjusted by the register to represent the digital setting in the related order of the register, a second group of contact sets, one set for each denominational order of the register and settable to represent a second amount, a third group of contact sets, one set for each denominational order of the register and settable to represent a third amount, a group of carry contact sets, one set for each denominational order of the register higher than the units order, circuit connections interconnecting the contacts related to the same denominational order and arranged in accordance with the table of addition, carry determining means controlled through the circuit connections of each order for setting the carry contact sets of the next higher order in accordance with carry conditions, an intermediate register controlled by said circuit connections, and means for sending current through the connections of each order simultaneously to enter the sum of said three amounts into said intermediate register.

2. In combination, a register settable to represent a multidenominational amount, a group of contact sets, one set for each denominational order of the register, adjusted by the register to represent the digital setting in the related order of the register, a plurality of further groups of contact sets, one set of each group for each denominational order of the register, the contacts of each group being settable to represent an amount, a group of carry contact sets, one set for each denominational order of the register higher than the units order, circuit connections interconnecting the contacts related to the same denominational order and arranged in accordance with the table of addition, carry determining means controlled through the circuit connections of each order for setting the carry contact sets of the next higher order in accordance with carry conditions, an intermediate register controlled by said circuit connections, and means for sending current through the connections of each order simultaneously to enter the sum of said amounts into said intermediate register.

3. In a machine of the class described, a register having denominationally ordered elements, a plurality of groups of contact sets, there being a contact set of each group for each denominationally ordered element of the register, and the contacts of each group being settable to represent an amount, a group of carry contact sets, one contact set for each denominational order of the register higher than the units order, circuit connections interconnecting the contacts related to the same denominational order and arranged in accordance with the table of addition, means for concurrently setting an amount in each of the first named groups of contact sets, means controlled through the circuit connections of each order for setting the carry contact sets of a higher order in accordance with carrying conditions, means controlled through the circuit connections of each order for entering the digits of the sum of the said amounts, each in the related denominationally ordered element, and means for rendering the connections effective to simultaneously control the carry contact setting means and the entering means.

4. In an adding machine, a plurality of columns of sets of relay contacts, the contacts of each set being selectively settable to represent any digit, means for causing the contacts of one column to be set to represent the units digits of three multidenominational amounts, and for causing the contacts of another column to be set to represent the tens digits of said amounts, circuit connections for each column for connecting the contacts thereof in series, the connections for each group being arranged to effect a completed connection, in accordance with the table of addition, extending through all the sets of contacts of the column to represent the units digit of the sum of the digits set in the related column, tens carry means controlled by the column of contacts in which the units digits are set for readjusting the circuit connections of the tens order column to represent an additional unit or units, a set of amount representing magnets, and means effective for causing the columns of contacts to simultaneously control the tens carry means and the amount representing magnets to energize the magnets in accordance with the complete sum of the amounts set in said columns of contact devices.

5. In a machine of the class described, three sets of contacts, each settable to represent one of a plurality of digits to be added, electric circuit connections interconnecting said sets of contacts in accordance with the table of addition, a plurality of carry controlling magnets for modifying connections for a higher order in accordance with carry requirements, a set of registering magnets included in said circuit connections, means for transmitting current through said connections, said interconnections directing the current to effect energization of said registering magnets in accordance with the units digit of the sum of the digits set on the sets of contacts, and further means controlled through said circuit connections for energizing a number of said carry controlling magnets in accordance with the tens digit of the sum of the digits set on the sets of contacts, concurrently with the energization of said registering magnets.

6. In a machine of the class described, a plurality of groups of contact devices, each settable to represent a multidenominational amount, setting means therefor, an entry receiving device, a group of contact devices settable thereby to represent an amount standing in the receiving device, a register, a circuit network initially adjusted upon setting of all said groups of contact devices for controlling the register in accordance with the sum of said several amounts without tens carries, means for readjusting said network to include tens carry requirements, means controlled through said network for ascertaining the tens carry requirements for the amounts set up and for operating said readjusting means accordingly, means for transmitting a current impulse to said network, said last named means being effective to render the ascertaining and readjusting means simultaneously effective during the period of said current impulse to cause said current impulse to control the register in accordance with the complete sum of said amounts, and means controlled in part by said register, following its operation, for changing the setting of the contact devices of the entry receiving device to represent said complete sum.

7. The invention set forth in claim 4 in which means is provided for causing said setting means to set one of the amounts in said sets of relay contacts with the digits in the form of a tens complement in the units order and 9's complements in the tens order, means for determining when the units digit of an amount set as a complement is zero, and means controlled thereby for causing said tens carry means to add a fugitive one in the tens order when the units digit set as a complement is zero.

ARTHUR H. DICKINSON.
JOHN N. WHEELER.

REFERENCES CITED

The following references are of record in the file of this patent:

UNITED STATES PATENTS

| Number | Name | Date |
| --- | --- | --- |
| 1,813,830 | Weiner | July 7, 1931 |
| 2,165,298 | Paris | July 11, 1939 |
| 2,228,330 | Torkelson | Jan. 14, 1941 |
| 2,262,235 | Hofgaard | Nov. 11, 1941 |
| 2,304,442 | Bryce | Dec. 8, 1942 |
| 2,061,745 | Wadel | Nov. 24, 1936 |
| 2,364,540 | Luhn | Dec. 5, 1944 |
| 2,386,763 | Williams | Oct. 16, 1945 |
| 2,396,229 | Blakely | Mar. 12, 1946 |